US012748886B2

(12) United States Patent
Ganesan

(10) Patent No.: US 12,748,886 B2
(45) Date of Patent: Sep. 29, 2026

(54) FORMAT-PRESERVING TOKENIZATION

(71) Applicant: Visa International Service Association, San Francisco, CA (US)

(72) Inventor: Thiruvarun Ganesan, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 219 days.

(21) Appl. No.: 18/429,003

(22) Filed: Jan. 31, 2024

(65) Prior Publication Data

US 2025/0245380 A1 Jul. 31, 2025

(51) Int. Cl.
*G06F 21/62* (2013.01)
*H04L 9/06* (2006.01)

(52) U.S. Cl.
CPC ........ *G06F 21/6245* (2013.01); *H04L 9/0631* (2013.01); *G06F 2221/2113* (2013.01); *G06F 2221/2141* (2013.01)

(58) Field of Classification Search
CPC ......... G06F 21/6245; G06F 2221/2113; G06F 2221/2141; H04L 9/0631; H04L 9/0643
See application file for complete search history.

(56) References Cited

U.S. PATENT DOCUMENTS 10,021,085 B1 * 7/2018 Wu ..................... H04L 63/0807
10,951,392 B2 3/2021 Pivovarov
2012/0317036 A1 12/2012 Bower et al.
2016/0019396 A1 1/2016 Davis et al.
2016/0239836 A1 8/2016 Von Mueller et al.
2016/0358163 A1 12/2016 Kumar et al.
2018/0053008 A1 * 2/2018 Busch ..................... G06F 16/28
2018/0268407 A1 * 9/2018 Voldman ............... H04L 9/3228
2022/0343015 A1 * 10/2022 Shahin .................. H04L 9/0643
2024/0146520 A1 * 5/2024 Revelle ................. H04L 9/0866

OTHER PUBLICATIONS

PCT/US2025/012733, "International Search Report and Written Opinion", May 13, 2025, 10 pages.
Bellare et al., "Format-Preserving Encryption", Dept. of Computer Science & Engineering, UC San Diego; Dept. of Computer Science UC Davis; 2009, 25 pages.

* cited by examiner

*Primary Examiner* — Mohammad W Reza
(74) *Attorney, Agent, or Firm* — Kilpatrick Townsend & Stockton LLP

(57) ABSTRACT

A computer system according to embodiments can retrieve untokenized data and identify tokenizing data elements and non-tokenizing data elements. The computer system can generate dummy data and a cryptographic key using the untokenized data. The computer system can then generate a format-preserving token by encrypting the dummy data using the cryptographic key. The computer system can insert the non-tokenizing characters into the format-preserving token. The computer system can perform further processing on the format-preserving token, including storing the format-preserving token in a token vault.

20 Claims, 9 Drawing Sheets

FORMAT-PRESERVING TOKENIZATION

BACKGROUND

Organizations that collect data from users (or other stakeholders) are now often required to securely store and control access to that data, in order to prevent users' private information from being stolen or otherwise acquired. As a result of increasing demand for organizational data privacy, organizations now use a variety of techniques to protect data, including access level restrictions (including the use of active directory level or account level access restrictions) and policy-based encryption and decryption at the user level, operating system level, and/or disk level. Such techniques can be effective for preserving data privacy, but often make accessing or otherwise interacting with data more difficult and unpleasant for trusted individuals (e.g., data scientists), as it may be more difficult for those individuals to navigate access control systems in order to access data.

"Tokenization" is another technique that can be used to preserve data privacy. Using tokenization, tokens can be used as a substitute for input data (e.g., personally identifiable information) for storage and processing. For example, rather than storing personally identifiable data such as a user's name, an online service could instead store a token representative of that user's name. Because the token itself does not reveal the user's name, the user's privacy is preserved even if, for example, that token is stolen by a malicious hacker.

Tokens often comprise hashes generated using secure hashing methods. Such hashes often comprise 128, 256, or 512 pseudorandom (or otherwise random appearing) bit sequences. Such tokens can effectively mask the underlying data (e.g., a user's name) because it may not be possible to determine the underlying data from analysis of the corresponding hash. However, this process can make it difficult to manage and store such hash tokens effectively. A data scientist or database manager cannot determine what type of data (e.g., a name, a date, a phone number, etc.) has been tokenized by analyzing a hash token, as it may be impossible to differentiate between similar looking pseudorandom bit sequences. As such, it may be difficult for a database manager to identify, e.g., a set of tokens corresponding to phone numbers in a database, and differentiate those from a set of tokens corresponding to user names in that same database.

Further, hash-based tokens may be unsuitable for performing a variety of data analysis operations, such as data quality checks, because they comprise pseudorandom sequences of bits. For, example, for a streaming service, a valid account number may comprise a sequence of 16 numerical digits. However, a hash-based token generated from that valid account number may comprise a sequence of 256 bits. Analyzing this hash-based token cannot enable a computer system or a data scientist to determine whether the underlying account number is valid (i.e., contains 16 numerical digits), and thus hash-based tokens cannot be used for account validation.

Additionally, while a variety of data can be accessed from databases using filtering or query operations (including "join" operations), such access operations may be difficult or impossible to perform on stored hash-based tokens. For example, an individual can query a database to determine all records corresponding to the years 1990-2020, but cannot query hash tokens generated based off those years, as such hash tokens comprise pseudorandom bit sequences do not have a meaningful ordinal and sequential correspondence like numerical representations of years. This may make it difficult to perform analytics (e.g., user intelligence analytics) using hash-based tokens. As such, while conventional tokenization can be effective for preserving data privacy, conventional tokens can also make it more difficult for trusted entities within an organization to work with and analyze such data, limiting the usefulness of such tokens.

Embodiments address these and other problems, individually and collectively.

SUMMARY

Embodiments of the present disclosure are directed towards methods and systems for performing format-preserving tokenization, as well as format-preserving encryption. A format-preserving token can generally comprise a token that "matches" the format of the data used to generate that token, which may be referred to as "untokenized data" prior to its tokenization. For example, if untokenized data comprises a 10 digit phone number, a format-preserving token corresponding to that untokenized data may also appear to comprise a 10 digit phone number.

Format-preserving tokens are useful because they may be easier to work with and manage within a database or other data management system. For example, a data scientist or database manager may be able to easily recognize that a set of format-preserving tokens that "look like" phone numbers are tokenized phone numbers. Additionally, because format-preserving tokens retain the same format as their underlying untokenized data, they can be used in many of the same applications as the underlying data itself, without requiring undue modification of those applications. For example, it may be possible to query a database of phone number tokens to identify all phone number tokens corresponding to a given "area code" or "country code", using the same methods that one would use to query a database of real phone numbers. Such querying operations would generally be impossible with conventional hash tokens, as lengthy pseudorandom bit sequences may be difficult to interpreted as phone numbers. Likewise, because such tokens are format-preserving, some forms of private data analytics can be performed (e.g., user intelligence analytics) on the format-preserving tokens, rather than the underlying untokenized data. This again, is generally impossible with conventional hash tokens.

In summary, one embodiment comprises a method performed by a computer system. The computer system can retrieve untokenized data, which may comprise a sequence of untokenized data elements, including both "tokenizing data elements" and "non-tokenizing" data elements. Such non-tokenizing data elements can comprise features that can be used to identify a data type or data format of the untokenized data. For example, for a numerical date, the numbers in such a date can comprise tokenizing data elements. By contrast, a non-tokenizing data element can comprise a character such as a dash "-", or another delimiter used to separate numerical day, month, and year values in a given date.

The computer system can generate dummy data corresponding to the untokenized data, which can comprise a sequence of "dummy data elements" of similar length to the sequence of untokenized data elements. The computer system can likewise generate a cryptographic key using the untokenized data and a key generation method. The computer system can encrypt the dummy data using the cryptographic key and a format-preserving encryption method, thereby generating a format-preserving token corresponding to the untokenized data. If necessary, the computer system can insert the non-tokenizing characters into the format-preserving token, in order to make the format of the format-preserving token more consistent with the original untokenized data. For example, after extracting and encrypting the numerical values of a date, the computer system could re-insert the dashes at their respective locations of the format-preserving date token, thereby making it appear like a date. Additionally, the computer system can perform further processing on the format-preserving token, including e.g., storing the format-preserving token in a token vault, or performing some private token-based analysis on the format-preserving token.

Another embodiment is directed to a computer system comprising one or more processors and a non-transitory computer readable medium coupled to the one or more processors. The non-transitory computer readable medium can comprise instructions that, when executed by the one or more processors, cause the computer system to perform a method such as the method summarized above or a similar method.

Further, some embodiments are directed to methods of performing format-preserving encryption performed by a computer system. The computer system can retrieve a sequence of plaintext data elements, which can comprise a plurality of plaintext data elements. The computer system can identify a data type based on the sequence of plaintext data elements. Likewise, the computer system can identify a data element set based on the data type. The computer system can analyze the sequence of plaintext data elements, and thereby identify one or more encrypting data elements, one or more non-encrypting data elements, and one or more non-encrypting data element locations. The one or more non-encrypting data element locations can indicate one or more positions of the one or more non-encrypting data elements in the sequence of plaintext data elements.

The computer system can perform a format-preserving encryption on the one or more encrypting data elements, thereby producing an initial format-preserving sequence of ciphertext data elements. The initial format-preserving sequence of ciphertext data elements can comprise one or more ciphertext data elements, and the one or more ciphertext data elements can match the data element set. For example, if the sequence of plaintext data elements comprise a string of English letters (corresponding to, e.g., a name of an individual), then the data set can comprise the set of English letters, and the initial format-preserving sequence of ciphertext data elements can match this data element set, and also comprise a string of English letters. The computer system can insert the one or more non-encrypting data elements into the initial format-preserving sequence of ciphertext data elements based on the one or more non-encrypting data element locations, thereby producing a format-preserving sequence of ciphertext data elements.

Terms

A "server computer" may refer to a computer or cluster of computers. A server computer may be a powerful computing system, such as a large mainframe. Server computers can also include minicomputer clusters or a group of servers functioning as a unit. In one example, a server computer can include a database server coupled to a web server. A server computer may comprise one or more computational apparatuses and may use any of a variety of computing structures, arrangements, and compilations for servicing requests from one or more client devices.

A "client device" may comprise a device that accesses service(s) made available by a server computer. The server computer may be on another computer system, and as such, the client device may access the service by way of a network, such as the Internet. A client device may comprise a "client computer," and the term "client" may refer to either a program or computer hardware or software that accesses a service made available by a server computer, or may alternatively refer to an entity, such as a "user," that owns and/or operates the client device. For example, a client can comprise a web browser operating on a client device. A client device may comprise a "user device." One server computer may be a client computer of another server computer and may therefore comprise both a client computer and a server computer.

A "user" may refer to an entity that uses something for some purpose. An example of a user is a person who uses a "user device' or a "mobile device." A user device may refer to any device operated by a user, such as a smartphone, smartcard, wearable device, laptop, tablet, desktop computer, etc.

A "memory" may refer to any suitable device or devices that may store electronic data. A suitable memory may comprise a non-transitory computer readable medium that stores instructions that can be executed by a processor to implement a desired method. Examples of memories include one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-seed data processor adequate to execute program components for executing user and/or system generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xenon, and/or Xscale; and/or the like processors.

A "hash function" may refer to a function that takes data of arbitrary size or length as an input and produces data of fixed size or length as an output. The output of a hash function may be referred to as a "hash value" or a "hash." A hash function can be "collision resistant" if it has a reduced likelihood of a "hash collision", which can occur when two different inputs result in identical hash values. A hash function can be "secure" or "cryptographically secure" if it is difficult or impossible to determine the input of the hash function based on its output.

A "data structure" may refer to any structure that can be used to store data. "Databases", "data lakes", and "data tables" are examples of data structures. Typically, the term data structure can refer to virtual structures to store data, as opposed to physical structures. However, the term data structure may also refer to physical hardware used to store data. In some cases, terms such as "database" may refer to either physical hardware or a data structure implemented using that hardware.

A "database" may refer to a structured set of data held or stored in a computer or other device. Alternative, a database may refer to a device which hold such a structured set of data. A "data record" may refer to a unit of data stored in a database. Data stored in a database may be in the form of a "data table", an arrangement of data in rows, columns, or more complex structures. Data tables may comprise "key value" pairings, in which "values" (e.g., numerical values, strings, or any other data) are associated with corresponding "keys" (e.g., labels corresponding to those values). Databases can be parsed (e.g., searched or queried) or sorted based on the values corresponding to keys, e.g., using query languages such as SQL.

A "data element" may comprise a recognizable unit of data. For example, for a set of data points, a data element may comprise a single data point. A data element may itself comprise other data elements. For example, a three-dimensional data point may comprise a data element comprising an x-value, a y-value, and a z-value, and each of the x-value, y-value, and z-values may comprise data points.

A "sequence" may comprise an ordered collection of things. A "sequence of data elements" may comprise an ordered collection of data elements. For example, the numbers [1, 5, 9, 4] may comprise a sequence of numeric data elements. A "string" may refer to a sequence of "characters" (e.g., symbols). For example, the string "John Doe", may comprise a sequence of English letters representative of a name. Another example of a string is an alphanumeric sequence such as "JDoe123@example.com". A character may comprise a data element. As such, a string such as "John Doe" may also comprise a sequence of data elements.

A "data type" may define a type corresponding to a data element or a sequence of data elements. For example, for a sequence of data elements "John Doe", a corresponding data type may comprise "English-language name". By contrast, for a sequence of data elements "08-19-1993" a corresponding data type may comprise a "date". A data type may have a corresponding "data format", which may indicate a format or mode of presentation corresponding to data of that data type. For example, a sequence of data elements comprising a date may have a "MM-DD-YYYY", in which the first two numeric digits are indicative of a month, the second two numeric digits are indicative of a day of that month, and the four remaining numeric digits are indicative of a year.

A "data element set" may refer to a set of data elements. A data element set may be associated with a data type, indicating data elements that may be observed in a sequence of data elements corresponding to that data type. For example, for the data type "English-language name", a data element set may comprise uppercase and lowercase English letters.

"Dummy data" may refer to data that has no meaning. "Dummy data" may comprise a sequence of "dummy data elements", individual data elements that have no meaning. For example, while a sequence of data elements "John Doe" may communicate an English-language name, a similar sequence of dummy data elements "AAAA AAA" may not communicate a real English-language name and may arguably hold no meaning.

A "token" may comprise data that is used as a substitute for other data. "tokenization" may refer to a process used to generate tokens based on input data. "Detokenization" may refer to a process used to generate original input data based on tokens. Tokens can be used as substitutes for input data in order to protect the privacy of that input data.

DETAILED DESCRIPTION

Figure 1:
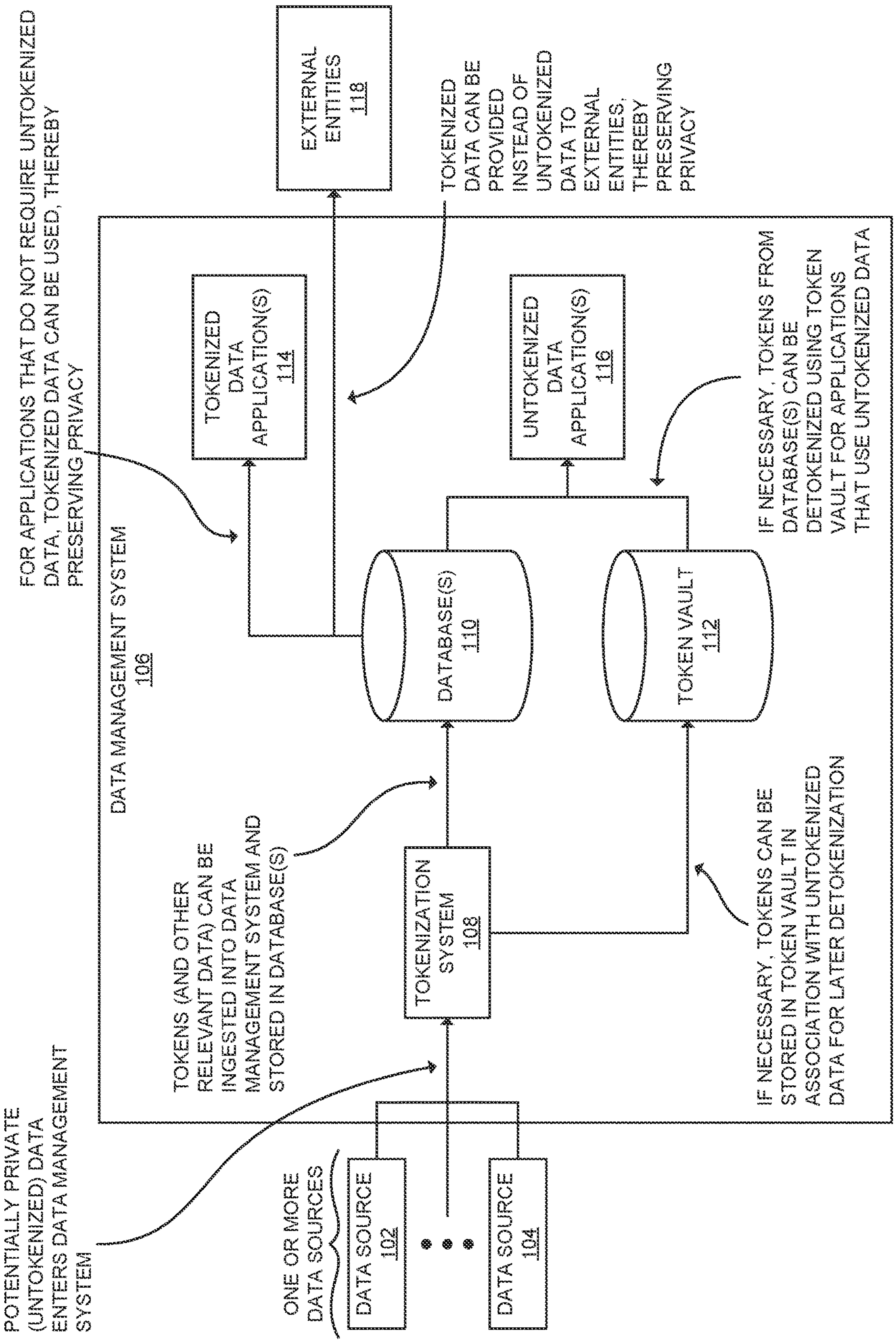
FIG. 1 shows a block diagram of an exemplary data management system used to describe format-preserving tokenization.

Before describing methods and systems in more detail, it may be useful to generally describe data management systems and the use of tokenization in such systems. FIG. 1 shows a diagram of a data management system 106, which may be useful for this purpose. Such a data management system 106 may be associated with a service or an organization that provides such a service. For example, data management system 106 may be associated with an online video streaming service that streams movies or television shows to subscribers.

The data management system 106 may collect or receive data from one or more data sources, e.g., data sources 102-104. The data received from data sources 102-104 may comprise untokenized data. These data sources 102-104 could comprise, for example, users of a service associated with data management system 106 (e.g., users of a streaming service) or client computers associated with those users (e.g., smartphones, laptops, or tablets that users are using to access the service). Alternatively or additionally, data sources 102-104 could comprise third party data acquired from another organization or entity (e.g., advertising data acquired from an advertising partner), or any other appropriate data source.

An entity or organization associated with data management system 106 may collect this data to, e.g., provide or enrich an associated service provided by that entity. For example, a streaming service could collect payment data (e.g., credit card data) in order to bill customers for using that service. Additionally or alternatively, the streaming service could use viewership data to develop new shows based on their viewers' interests. However, such data, particularly personally identifiable information, may be private or sensitive. An entity or organization associated with the data management system 106 may be required to protect private data received from data sources 102-104.

While such private or sensitive data could be stored in a database or databases (e.g., database(s) 110), storing sensitive data along with non-sensitive data in database(s) 110 can lead to data management problems. If an organization is required to remove sensitive data from database(s) 110 (e.g., at the request of a user as part of their "right to be forgotten"), it can be difficult, time consuming, and require specialized software to identify and remove this sensitive data. Further, storing sensitive data in database(s) 110 requires additional access controls in order to prevent malicious hackers from acquiring the data during a data breach.

In some cases, it may be easier to store tokenized data rather than private data in database(s) 110. Such tokenized data may not reveal any personally identifiable information and may pose less risk of theft by malicious hackers. To this end, the data management system 106 may include a tokenization system 108, which may tokenize data received from the one or more data sources 102-104, thereby generating tokenized data, which may be referred to more generally as "tokens." Such a tokenization system could comprise a computer system, server computer, or cluster or computer systems or server computers performing tokenization operations.

After generating tokens from untokenized data received from the one or more data sources 102-104, the tokenization system 108 can store these tokens, along with other relevant data (e.g., non-private or non-sensitive data) in database(s) 110. For example, for a streaming service, a user's name may comprise personally identifiable information, and thus may be tokenized to protect the user's privacy. However, a user's viewership information (e.g., what shows the user watches) may not comprise personally identifiable information. As such, a record could be stored in database(s) 110 that relates a token corresponding to the user's name to the user's viewership data.

If it is necessary to store untokenized private data, the tokenization system 108 (or another appropriate computer system or subsystem of the data management system 106) can encrypt this private data and store it in a token vault 112 in association with the corresponding token. If the private data later needs to be retrieved, the data management system can query the token vault 112 using a token to identify a ciphertext corresponding to the untokenized private data. This ciphertext can then be decrypted to produce the untokenized data. However, some data management systems 106 may be "vault-less," in which case a token vault 112 may not be used, and in which case it may not be possible to "de-tokenize" tokens to produce the original untokenized data.

The data management system 106 may use received data in a variety of applications. Such applications could include, e.g., analytics applications, such as user analytics. For example, a streaming service could collect data from data sources 102-104 (e.g., users) indicating which shows those users are watching, how often they watch those shows, etc., and use that data to recommend shows to users. These analytics applications can include tokenized data application(s) 114 and untokenized data application(s) 116.

Tokenized data application(s) 114 can include analytics applications (or other applications) that can be executed on tokenized data (and, e.g., relevant non-sensitive data) and do not need corresponding untokenized data. For example, it may be possible for an organization associated with a streaming service to determine the 10 most popular shows on the service without needing the specific names of users (which may comprise private data) that watch those shows.

By contrast, untokenized data application(s) 116 can include applications that require tokenized data to operate. For example, billing services associated with a streaming service may require personally identifiable information such as user names and payment account numbers in order to bill users of the service. If necessary, such information can be retrieved from token vault 112 using tokens stored in database(s) 110. For example, if it is determined that an account associated with a payment account token is due to pay their monthly bill, a billing application can use the token to identify a corresponding encrypted payment account number in the token vault 112, then decrypt that encrypted payment account number to retrieve the payment account, in order to request funds from that payment account as part of the billing process.

In some cases, the data management system 106 can provide tokenized data (and, e.g., non-private data) to external entities 118 (e.g., client computers). Such external entities 118 may use this data for their own analytics purposes, and providing tokenized data to the external entities 118, in place of private data, may preserve the privacy of the one or more data sources. As another alternative, the external entities could comprise external cloud storage servers, which the data management system 106 (or, e.g., an organization associated with the data management system 106) may use to expand their data storage capabilities. Because such cloud storage servers may be associated with other organizations and entities, there may be increased risk when storing potentially sensitive data on such cloud storage servers. As such, generating and storing format-preserving tokens on external cloud storage servers (rather than the private data used to generate such format-preserving tokens) may protect the privacy of data received from the one or more data sources 102-104.

Unfortunately as described above, conventional non-format-preserving tokens may be difficult to manage and use. An operator of data management system 106 may have difficulty determining the data type of untokenized data corresponding to tokens stored in database(s) 110, e.g., whether those tokens represent tokenized phone numbers, names, dates, etc. Likewise, many tokenized data application(s) 116 may be difficult or impossible to perform on hash-based tokens. For example, it may be difficult to effectively perform cloud storage or other data transfers as part of a data backup application when using conventional hash tokens, as an organization may need to change schemas or otherwise transform the hashed data while loading it into cloud storage for redundancy, backup, or data recovery. Additionally, hash-based tokens may be difficult to use in business intelligence and user interface applications. Further, hash-based tokens may be difficult for external entities 118 to use in the development of their own applications, as such hash-based tokens are not similar to the tokenized data, and may require changes in coding logic, typecasting, and the development of new and cumbersome functions. However, by using format-preserving tokenization methods according to embodiments of the present disclosure (described in more detail below), such tokenized data application(s) 114 may be possible.

The devices, computers, and other entities in FIG. 1 can communicate with one another via one or more communication networks. Communication networks can take any suitable form, and may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a wireless application protocol (WAP), I-mode, and/or the like); and/or the like. Messages between the computers, entities, and other devices in FIG. 1 (e.g., between client devices comprising the one or more data sources 102-104 and the tokenization system 108) may be transmitted using a communication protocol such as, but not limited to, File Transfer Protocol (FTP); Hypertext Transfer Protocol (HTTP); Secure Socket Layer (SSL), ISO (e.g., ISO 8583) and/or the like. As an example, computers and other devices within the data management system may communicate over a Local Arena Network, while computers and other devices in the data management system may communicate with the one or more data sources 102-104 and the external entities 118 over a network such as the Internet.

Format-preserving tokenizing methods according to embodiments of the present disclosure can make use of format-preserving encryption techniques. As such, format-preserving encryption is described in some detail below with reference to FIG. 2A and is contrast with a general summary of format-preserving tokenization methods according to embodiments, which is described below with reference to FIG. 2B.

Figure 2A:
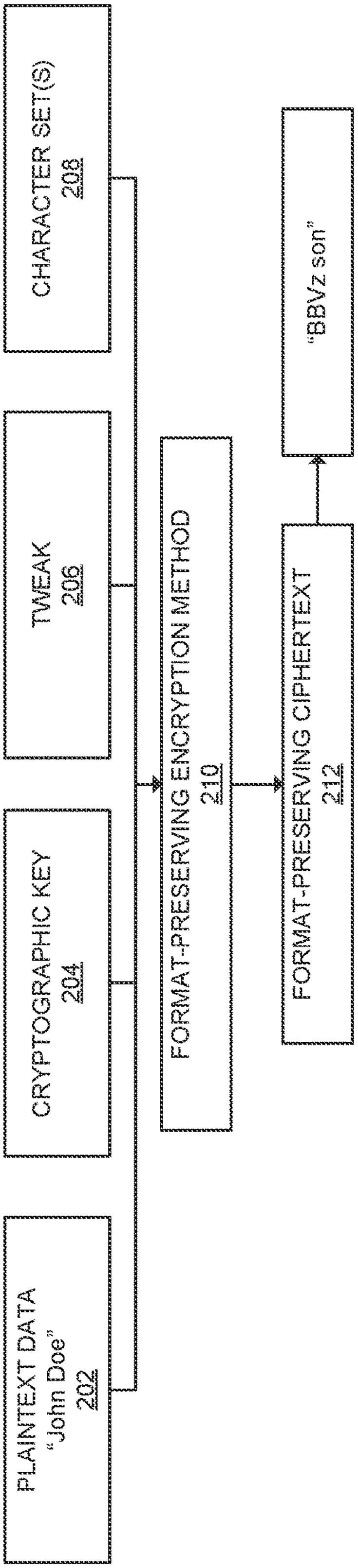
FIG. 2A shows a diagram summarizing format-preserving encryption according to some embodiments.

FIG. 2A shows a diagram summarizing the inputs and outputs of a format-preserving encryption method 210. Such a format-preserving encryption method could comprise a Feistel-based format-preserving encryption method, such as "FF1" or "FF3", defined by National Institute of Standards and Technology (NIST) Standard SP 800-38G. Format-preserving encryption method 210 can take in four input variables. These can include the plaintext data 202 to be encrypted by the format-preserving encryption method 210 (e.g., a user's name such as "John Doe"), as well as a cryptographic key 204 that can be used to perform encryption and decryption (e.g., for a symmetric format-preserving encryption method 210). Other inputs can include a "tweak" 206, which can comprise a non-empty set of strings from the "tweak space." In concept, different tweaks relate different encryption mappings between plaintext data and ciphertext data. Such tweaks may enable users to change encryption mappings without requiring those users to change the cryptographic key 204 used in encryption. Another input can comprise one or more character set(s) 208, which can enable the format-preserving encryption method 210 to actually preserve the format of the input data. The character set(s) 208 can define the sets of characters to be used in the ciphertext output of the encryption process. For example, for an English language name such as "John Doe", the character set(s) 208 could comprise the set of uppercase English letters, the set of lowercase English letters, and a set of punctuation marks including the space character.

With the four inputs, format-preserving encryption method 210 can be performed to produce a format-preserving ciphertext, e.g., "BBVz son". While this exemplary format-preserving ciphertext 212 is not a valid English name, it has generally the same structure as the plaintext data 202 "John Doe", i.e., it contains a substring of English letters of length four ("BBVz" corresponding to "John") followed by a space, followed by a substring of English letters of length three ("son" corresponding to "Doe"). A database manager or data scientists may recognize that the format-preserving ciphertext is representative of a name or is at least representative of an English-language strings based on its structure.

Like conventional encryption, format-preserving encryption can be reversed by decryption. An individual or computer system with access to the cryptographic key 204, the tweak 206, the character set(s) 208, and the format-preserving ciphertext 212 could decrypt the format-preserving ciphertext and reproduce the plaintext data 202. As such, while format-preserving encryption can be used to protect private data, there may be risks associated with providing format-preserving ciphertexts to individuals outside of an organization, or by storing format-preserving ciphertexts on public cloud storage resources. By contrast, as described in further detail below, in format-preserving tokenization it may not be possible to reproduce untokenized data even if a relevant cryptographic key, tweak, character set, and the format-preserving token are known. As such, format-preserving tokenization is generally more secure than format-preserving encryption because it cannot be reversed via decryption. Format-preserving tokenization can alleviate some of these risks associated with format-preserving encryption while still preserving the format of the tokenized data.

Figure 2B:
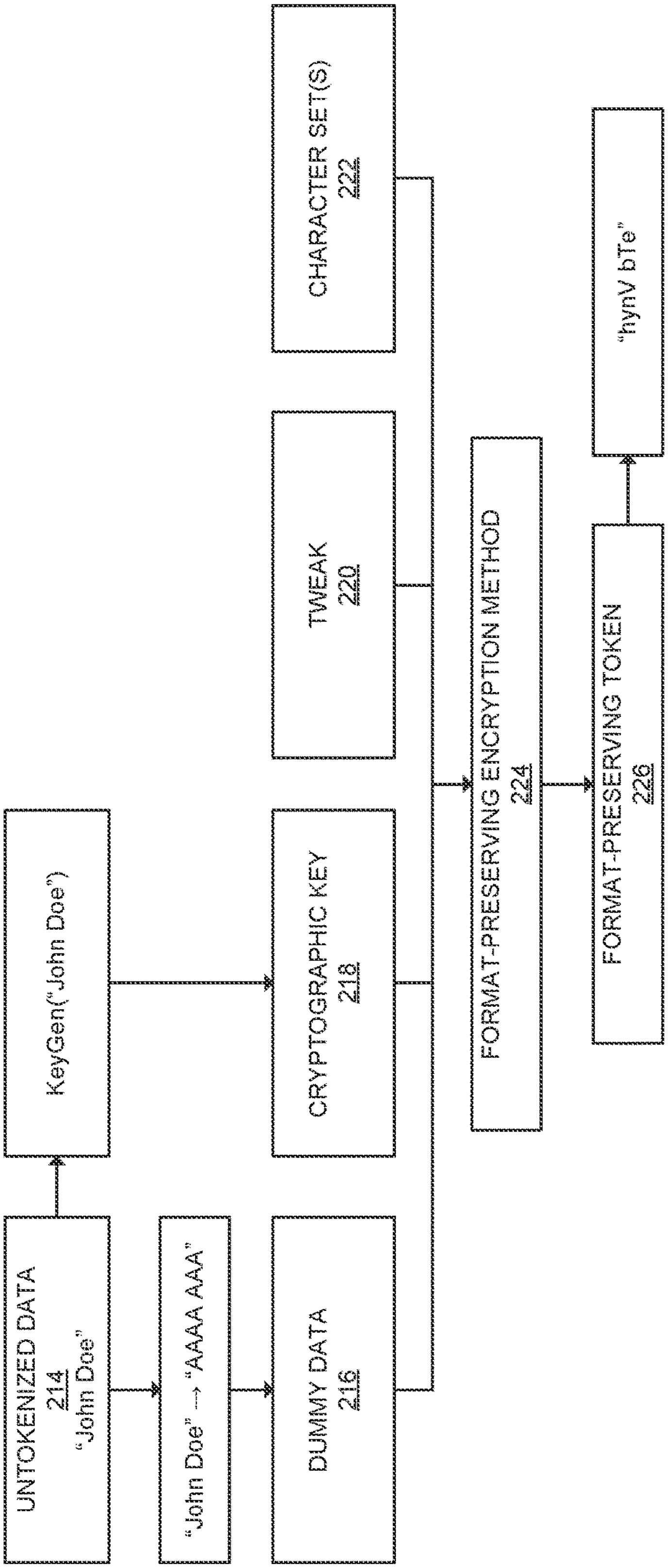
FIG. 2B shows a diagram summarizing format-preserving tokenization according to some embodiments.

FIG. 2B summarizes an exemplary format-preserving tokenization method according to some embodiments. Format-preserving tokenization can involve the use format-preserving encryption methods, such as FF1 and FF3. However, unlike format-preserving encryption, format-preserving tokenization can use dummy data derived from the untokenized data and a cryptographic key derived from untokenized data. While the cryptographic key used for format-preserving encryption is constant (e.g., different plaintexts can be encrypted using the same cryptographic key), the cryptographic key used for format-preserving tokenization can be dynamic and dependent on the untokenized data 214.

In summary, untokenized data 214 (e.g., a user's name such as "John Doe") can be used to derive a cryptographic key 218 using a key generation method. Such a key generation method could comprise a hashing method, e.g., the cryptographic key 218 could comprise a hash of the untokenized data 214, or alternatively, a hash of the untokenized data 214 could be used as a key seed, which could be used to generate a cryptographic key. Additionally, dummy data 216 can be generated from the untokenized data 214. Such dummy data 216 could comprise repeating instances of a dummy data element. For example, for untokenized data comprising an English-language string "John Doe", dummy data 216 could comprise an English-"language" string such as "AAAA AAA", comprising repeated instances of the dummy character "A" along with a space. Such a string can comprise two substrings, the first comprising "AAAA" (and corresponding to "John") followed by a space, followed by the second substring comprising "AAA" (corresponding to "Doe"). For untokenized data such as "John Q. Public", corresponding dummy data could comprise, e.g., "AAAAA. AAAAAA".

Notably, any English-language letter could conceivably be used as the dummy data element, e.g., "B", or "a" would be equally applicable as "A". However, it may be preferable for the dummy character to be consistent across tokenization operations, e.g., it may be preferable for "A" to be used as the dummy character when tokenizing both "John Doe" and "John Q. Public".

A format-preserving encryption method 224 can be used to encrypt the dummy data 216 using the cryptographic key 218, the tweak 220, and a relevant character set. The result can comprise a format-preserving token 226, e.g., "hynV bTe". While the format-preserving token 226 is generally not a valid English name, it generally has the same structure as the plaintext data 202 "John Doe", i.e., a substring of English letters of length four ("hynV" corresponding to "John") followed by a space, followed by a substring of English letters of length three ("bTe" corresponding to "Doe"). A database manager or data scientists may recognize that the format-preserving ciphertext is representative of a name or is at least representative of an English-language string.

Unlike the format-preserving ciphertext 212 described above, the format-preserving token 226 cannot be decrypted to recover the untokenized data 214. If an individual did manage to acquire the cryptographic key 218 and decrypt the format-preserving token, they would recover the dummy data 216, rather than the untokenized data 214. This dummy data 216 is generally insufficient to recover the untokenized data 214, as it is not possible to determine the original untokenized data 214 given a repeating string of dummy data elements. Further, provided a secure method (e.g., a secure hashing method) was used to generate the cryptographic key 218 from the untokenized data 214, then the cryptographic key 218 cannot be reversed to acquire the untokenized data 214. As such, format-preserving tokens effectively protect the underlying untokenized data while still maintaining the data format.

Having summarized format-preserving encryption and format-preserving tokenization methods according to embodiments, it may be helpful to describe format-preserving tokenization methods according to embodiments in more detail, as described below with reference to FIGS. 3, 4A and 4B. Such methods can be performed by a computer system, which could comprise, e.g., a tokenization system associated with a data management system, e.g., as depicted in FIG. 1.

Figure 3:
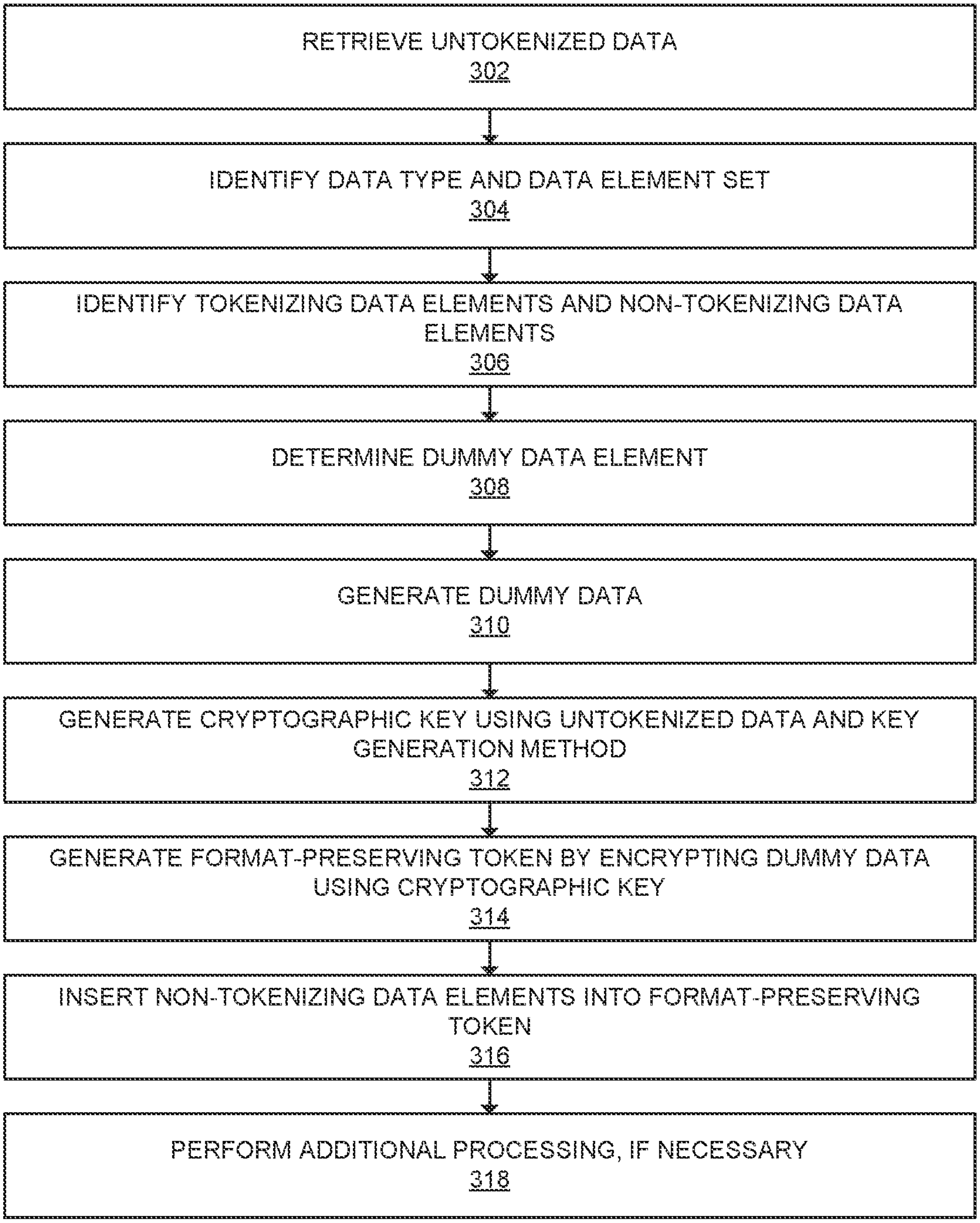
FIG. 3 shows a flowchart of an exemplary method for performing format-preserving tokenization according to some embodiments.

FIG. 3 depicts a flowchart of an exemplary format-preserving tokenization method according to some embodiments. At step 302, a computer system can retrieve untokenized data. This untokenized data can comprise potentially sensitive or private data, which can be protected by the computer system via format-preserving tokenization. The computer system can retrieve the untokenized data from one or more data sources. These data sources could comprise, for example, users of a service associated with a data management system or client devices associated with those users (e.g., smartphones, laptops, or tablets that users are using to access the service). Such data sources could also comprise third party data acquired from another organization or entity (e.g., advertising data acquired from an advertising partner), or any other appropriate data source, including databases associated with (or accessible to) the computer system. FIG. 4A depicts the receipt of untokenized data (step 420 in FIG. 4A) comprising an exemplary untokenized sequence of data elements 402, itself comprising an identification number “10-18-90”.

There are a variety of different types, formats, and forms of untokenized data. As such, before describing steps 304-318 of FIG. 3, it may be helpful to describe some aspects of untokenized data in more detail.

Untokenized data may comprise a plurality of untokenized data elements. Such untokenized data elements can comprise identifiable “units” of data that may collectively make up the untokenized data. For example, untokenized data can comprise an untokenized string comprising a plurality of untokenized characters, such as the name “John Doe”. In such a case, the untokenized characters can comprise the untokenized data elements. Untokenized data elements can themselves be composed of more “fundamental” data elements. For example, an untokenized character such as the letter “J” can itself be encoded by a sequence of bits, e.g., according to the UTF-8 encoding or any other encoding method.

The plurality of untokenized data elements may be ordered such that they form a sequence of untokenized data elements. It may be possible to identify the location of each untokenized data element within the sequence of untokenized data elements based on their ordering. For example, in the untokenized string “John Doe”, the untokenized character “D” may occupy the 6th position, index, or location in the untokenized string. As another example, an untokenized sequence of data elements could comprise a sequence of frames corresponding to a video file, and a particular frame number (e.g., the “231$^{st}$ frame”) could be used to identify a particular data element in that sequence. As depicted in FIG. 4A, eight untokenized data element locations 404 can correspond to the eight untokenized data elements in the untokenized sequence of data elements 402.

The untokenized data elements (or untokenized characters) may correspond to one or more “data element sets” (or one or more “character sets”), which may define what constitutes an acceptable data element (or character) for a data type associated with the untokenized data. For example, untokenized data comprising an English-language name such as “John Doe” may correspond to data element/character sets comprising the uppercase and lowercase English letters. As another example, for untokenized data comprising an English-language name such as “John Q. Public”, one or more data element/character sets may comprise the uppercase and lowercase English letters as well as a set of punctuation marks including the period “.”. As another example, for the untokenized sequence of data elements 402 in FIG. 4A, the one or more data element sets/character sets can comprise the Arabic numerals 0-9, as well as a set of punctuation marks including the dash “-”.

In some embodiments, one or more character sets associated with untokenized data can comprise one or more of the following: one or more sets of numeric digits (e.g., the Arabic numerals 0-9 or any other numeral set), one or more alphabets (e.g., the English alphabet), one or more sets of logograms (e.g., Chinese characters or “Hanzi”), one or more sets of symbols associated with one or more syllabaries (e.g., the Japanese hiragana and katakana), one or more sets of typographical symbols, and one or more other symbols. It should be understood that methods according to embodiments can be practiced using any number and variety of character sets, including character sets not listed above.

Likewise, untokenized data can be associated with one or more data types, and those one or more data types can be associated with one or more data formats. A data type may classify or distinguish between different groups or groupings of untokenized data. For example, untokenized data comprising a name “John Doe” may be of the “name” data type, while untokenized data comprising an identification number “10-18-1990” may be of the “identification number” data type. In some embodiments, one or more data types can include one or more of the following: one or more segments of text (e.g., “The quick brown fox jumped over the lazy red dog.”), one or more names (e.g., “John Doe”), one or more numbers (e.g., identification numbers, account numbers, etc.), and one or more dates (e.g., “January-1-2024”). It should be understood that methods according to embodiments can be practiced using any number and variety of data types, including data types not listed above.

A data type may be associated with one or more respective data formats, which may comprise generally understood ways of communicating the information associated with that data type. For example, untokenized data with a “date” data type could be associated with a format such as the “day, month, year” format, or “DD-MM-YYYY”, where “DD” are digits representative of the day of the month, “MM” are digits representative of the month of the year, and “YYYY” are representative of the year in the Gregorian calendar AD. Alternatively, untokenized data with a data type corresponding to a date could be associated with a format such as the “month, day, year” format, or “MM-DD-YYYY”, or any other format (e.g., dates formatted in accordance with convention for the Vikram Samvat, the solar Hijri, the Hebrew calendar, etc.).

A plurality of untokenized data elements in a sequence of untokenized data elements can comprise one or more “tokenizing data elements” and one or more “non-tokenizing data elements.” The one or more tokenizing data elements can comprise data elements that are tokenized as part of the tokenization process, while the one or more non-tokenizing data elements are not tokenized, generally for the purpose of preserving the format of the untokenized data during tokenization. As an example, for the untokenized sequence of data elements 402 in FIG. 4A, representative of an identification number, the identification number may comprise a "department-group-individual" format, where numerical values representative of an individual's department number, group number, and individual number are separated by dash "-" delimiters. Preserving the format of such an identification number may involve preserving these dashes, and as such the dashes may comprise non-tokenizing data elements (e.g., non-tokenizing data elements 408 with corresponding non-tokenizing data element locations 410, as depicted in FIG. 4A). By contrast, the tokenizing data elements 406 can comprise the numerical components of that identification number (i.e., "10", "18", and "90"), as these numerical components are representative of the potentially sensitive or private data that can be protected via tokenization.

More specifically, in some embodiments, one or more tokenizing data elements can comprise one or more delimiters associated with one or more data types (described in more detail below) of the untokenized data. For example, for untokenized data with a "date" data type, non-tokenizing data elements can comprise delimiters such as dashes "-", slashes "/", periods ".", or any other delimiter used to separate the numerical elements representative of days, months, years, hours, minutes, seconds, etc. Such delimiters could also comprise non-tokenizing data elements for other data types, such as identification numbers. As another example, for untokenized data with a "name" data type (e.g., the name of an individual), the non-tokenizing data elements can comprise delimiters used to separate given names, family names, generational names, etc., such as the space between "John" and "Doe" in the name "John Doe." Data with the "name" data type may comprise a string, and as such, the name data type may be a subtype of a string data type.

It should be understood that if the untokenized data corresponds to multiple data element sets (or one or more character sets), different data element sets (or character sets) may correspond to the tokenizing data elements and the non-tokenizing data elements. For example, for untokenized data comprising the name "John Doe", the tokenizing data elements may comprise the letters "JohnDoe" and may correspond to the data element set(s) (or character set(s)) comprising the uppercase and lowercase English letters, while the non-tokenizing data elements may comprise the space between "John" and "Doe" and may correspond to a data element set (or character set) comprising punctuation marks. As described above with reference to FIG. 2B (and described in more detail below), one or more character sets (e.g., character set(s) 222 from FIG. 2B) may be used as part of a format-preserving encryption method (e.g., format-preserving encryption method 224) in order to generate a format-preserving token (e.g., format-preserving token 226). In some cases, the one or more character sets used during format-preserving tokenization may comprise the one or more character sets corresponding to the tokenizing data elements and may not comprise the one or more character sets corresponding to the non-tokenizing data elements.

In some embodiments, the untokenized data can comprise a timestamp representative of a date (e.g., a Unix timestamp). In such cases, the plurality of untokenized data elements can comprise a plurality of numerical digits, and the sequence of untokenized data elements can comprise a string of numerical digits. In such cases, the one or more non-tokenizing data elements can comprise one or more most significant numerical digits of the timestamp. These most significant digits may comprise non-tokenizing data elements in order to produce reasonable or realistic format-preserving date tokens.

For a 10 digit signed Unix timestamp for which there are no non-tokenizing data elements, possible format-preserving tokens range from −9999999999-9999999999, corresponding to the date range from roughly Feb. 10, 1653 to Nov. 20, 2286. At the time of writing, Feb. 10, 1653 is over two centuries in the past, and Nov. 20, 2286 is over two centuries in the future, and may not be considered "realistic" dates for some applications (e.g., tokenized birthdates of subscribers to a streaming service). By contrast, if the most significant digit of a 9 digit Unix timestamp is a non-tokenizing character, then (at the time of writing), possible format-preserving tokens range from −199999999-199999999, corresponding to the date range from Aug. 31, 1963 to May 18, 2033. While this range still includes dates in the future, these dates are at most one decade into the future, and may be considered more "realistic" for some applications.

A sequence of untokenized data elements may sometimes be referred to as a "first sequence of data elements", in order to differentiate those data elements from a sequence of dummy data elements (which may be referred to as a "second sequence of data elements"), which may be generated by the computer system as part of the exemplary tokenization method, e.g., in step 310 described below. It should be understood that the term "untokenized data" refers to data that can be received by the computer system at step 302, and which the computer system can tokenize using any of the methods described herein. Untokenized data does not necessarily refer to data that does not comprise tokens. While unlikely, the computer system could retrieve "untokenized data" that comprises tokens from one or more data sources, which may have been previously tokenized by those data sources. The computer system could conceivably generate format-preserving "tokens of tokens" using the steps described below.

Referring back to FIG. 3, at step 304, the computer system can identify a data type based on the untokenized data. The computer system can use any appropriate method to identify a relevant data type. For example, the computer system can iterate through the sequence of untokenized data elements comprising the untokenized data and attempt to identify a data type based on this iteration. For an identification number, for example, if the computer system identifies a series of numeric data elements followed by a dash or other delimiter (which itself may be followed by more numeric data elements), then the computer system may identify the "identification number" data type based on the untokenized data. As another example, if the computer system identifies a series of English language characters (e.g., "John") followed by a space character, the computer system can search a database of English language names to attempt to identify a match. If a match is found, the computer system can identify a "name" or "English language name" data type based on the untokenized data. As yet another example, if the computer system identifies a series of English language characters and numbers, the computer system can determine an alphanumeric data type. As yet another example, the computer system can use any number and variety of regular expressions (or other appropriate match patterns) in order to identify a data type. As another example, in some cases the data type may be communicated to the computer system when the computer system retrieves the untokenized date (e.g., at step 302). For example, the computer system could retrieve a set of labeled untokenized dates (which include the untokenized data) from a database at step 302.

Additionally at step 304, the computer system can identify a data element set based on the data type. In some embodiments, the data element set can comprise a combination of multiple data element subsets, e.g., for untokenized data comprising an English-language name, a data element set can comprise a set corresponding to uppercase English letters (one subset) and lowercase English letters (a second subset). The computer system can use any appropriate method to identify the data element set based on the data type. As one non-limiting example, the computer system may maintain a lookup table relating data element sets to data types. If the computer system determined a data type such as "English language name" based on the untokenized data, then the computer system could look up a corresponding data element set (e.g., uppercase and lowercase English letters) in the lookup table and could thereby use the lookup table to identify the data element set.

At step 306, the computer system can analyze the untokenized data (comprising, e.g., a sequence of untokenized data elements) and identify one or more tokenizing data elements and one or more non-tokenizing data elements. Additionally at step 306, the computer system can identify one or more non-tokenizing data element locations. These one or more non-tokenizing data element locations can indicate one or more positions of the one or more non-tokenizing data elements in the sequence of untokenized data elements, and can be used in later steps (e.g., step 316) to re-insert the non-tokenizing data elements into either the dummy data or a format-preserving token in order to preserve the format of the untokenized data.

Figure 4A:
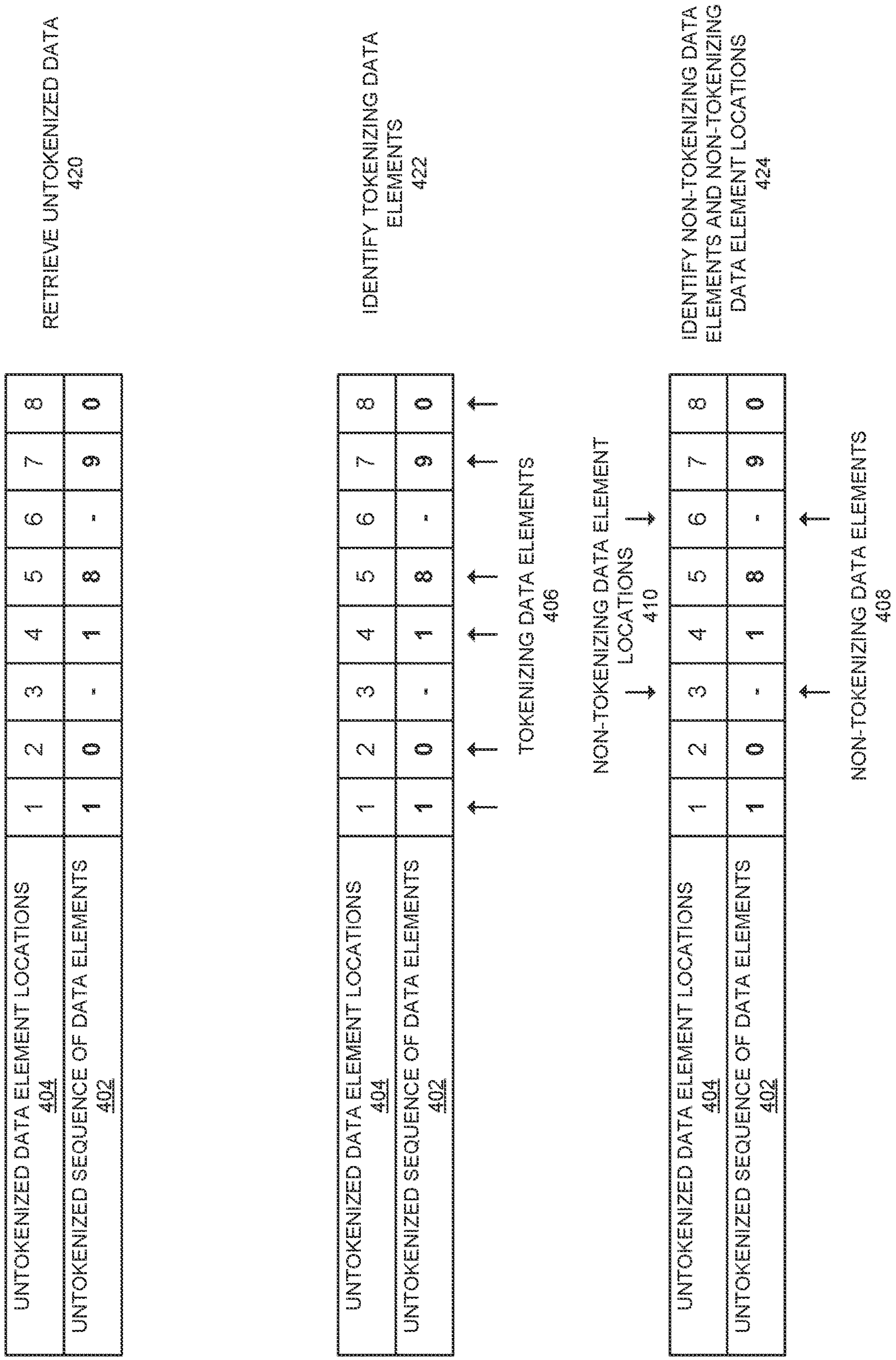
FIGS. 4A-4B illustrate a format-preserving tokenization method performed on an exemplary sequence of untokenized data elements.

Step 306 of FIG. 3 is generally depicted in steps 422 and 424 in FIG. 4A. At step 422 of FIG. 4A, for the untokenized sequence of data elements 402 comprising the identification number "10-18-90", the computer system identifies tokenizing data elements 406 comprising the numerical digits of the untokenized sequence of data elements 402. Likewise, at step 424 of FIG. 4A, the computer system identifies the non-tokenizing data elements 408 comprising the dashes "-" in the untokenized sequence of data elements 402. The computer system can further identify the non-tokenizing data element locations 410 from the untokenized data element locations 404, i.e., locations 3 and 6, indicating that the dashes are located at the $3^{rd}$ and $6^{th}$ position in the untokenized sequence of data elements 402.

The computer system can identify the one or more tokenizing data elements and the one or more non-tokenizing data elements using any appropriate method. For example, the computer system could use the data element set identified at step 304 in order to determine the one or more tokenizing data elements and the one or more non-tokenizing data elements. The computer system could iterate through the untokenized data and determine if each data element is part of the data element set. If a data element is part of the data element set, then the computer system can determine that it is a tokenizing data element. If a data element is not part of the data element set, the computer system can determine that the data element is a non-tokenizing data element. Alternatively, if the data element is part of a subset of the data element set associated with non-tokenizing characters (e.g., a data element subset associated with punctuation marks), the computer system can determine that the data element is a non-tokenizing data element. In some embodiments, the one or more non-tokenizing data elements can comprise one or more delimiters associated with one or more data types of the untokenized data. For example, for an identification number, these delimiters could comprise dashes "-" or slashes "/" separating numerical values representative of different identifying elements of the identification number. As described above, for untokenized data corresponding to a timestamp (e.g., a Unix timestamp), the computer system could determine that one or more most significant digits (untokenized data elements) of the timestamp (e.g., one or more of the first digits of the timestamp) are non-tokenizing data elements, and that the remainder of the digits are tokenizing data elements.

Optionally at step 306, the computer system can determine a length of untokenized data (which may be referred to as a "first sequence of data elements"), this length of the first sequence of data elements can comprise the number of data elements in the first sequence of data elements. The computer system can determine this length using any appropriate method, e.g., by iterating through the first sequence of data elements and counting the number of data elements, or by determining the number of data elements by evaluating a ratio of the memory allocated to store the first sequence of data elements and the memory allocated to store a single data element. This length of the first sequence of data elements can later be used by the computer system to generate dummy data comprising a second sequence of data elements (e.g., at step 310), which in some embodiments may be the same length as the first sequence of data elements.

Figure 4B:
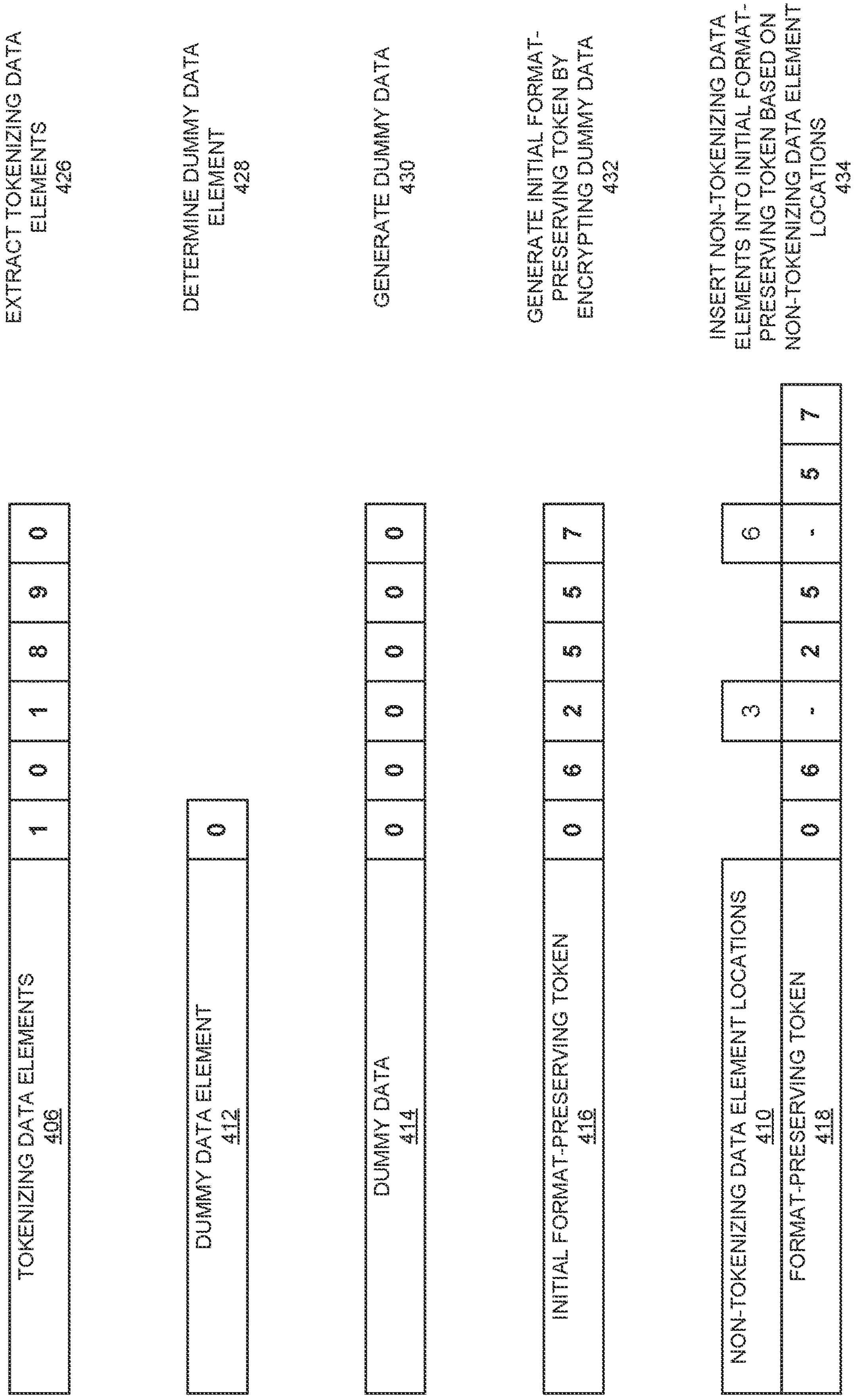

As depicted in step 426 of FIG. 4B, the computer system can "extract" the tokenizing data elements 406 from the untokenized sequence of data elements 402 depicted in FIG. 4A. As described in more detail below, the computer system can use these untokenized data elements to derive dummy data (e.g., at step 310 of FIG. 3), which may be encrypted using format-preserving encryption to produce a format-preserving token (e.g., at step 314 of FIG. 3). As described above, in FIGS. 4A and 4B, the tokenizing data elements can comprise the numbers "10", "18", and "90", which are separated by non-tokenizing dash "-" delimiters. As such, the tokenizing data elements 406 can comprise the sequence of data elements "101890", as depicted in FIG. 4B.

Referring to FIG. 3, at step 308, the computer system can determine a dummy data element. As depicted in step 428 of FIG. 4B, for the tokenizing data elements 406, the dummy data element 412 can comprise the numeric data element "0". In general, the dummy data element can comprise any data element from a data element set corresponding to the untokenized data, e.g., a data element set determined at step 304 of FIG. 3. As such, the computer system may determine the dummy data element based on a determined data element set. For example, for an identification number such as "10-18-90", a relevant data element set may comprise the Arabic numerals from 0 to 9, and as such the dummy data element may comprise any numeric digit from 0-9. In some cases, it may be preferable for the dummy data element to be consistent across tokenization operations, e.g., if the dummy data element for an identification number tokenization operation is the number "0", it may be preferable for the dummy data element for a subsequent identification number tokenization operation to also be the number "0". Similarly, if the dummy data element for a name tokenization operation (e.g., tokenizing an untokenized name such as "John Doe") comprises the uppercase English letter "A", then it may be preferable for the dummy data element for a subsequent name tokenization operation to also be the letter "A."

Referring to FIG. 3, at step 310, the computer system can generate dummy data corresponding to the untokenized data. In FIG. 4B, generation of dummy data 414 is depicted in step 430. The dummy data may comprise a sequence of dummy data elements comprising a number of repeating instances of the dummy data element (which may have been determined at step 308, as described above). This number of repeating instances may be equal to a number of tokenizing data elements in the one or more tokenizing data elements (which may have been identified at step 306, as described above). As depicted in FIG. 4B, tokenizing data elements 406 comprises six data elements. As such, dummy data 414 comprises six repeating instances of the dummy data element 412.

In some embodiments (particularly if the untokenized data comprises no untokenized data elements) the computer system can generate the dummy data based on the length of the first sequence of data elements (i.e., the sequence of untokenized data elements) and the dummy data element by generating a second sequence of data elements comprising a plurality of repeating instances of the dummy data element. The length of the second sequence of data elements may be equal to the length of the first sequence of dummy data elements. In such embodiments, the dummy data may comprise the second sequence of data elements.

Referring to FIG. 3, at step 312 the computer system can generate a cryptographic key using the untokenized data and a key generation method, as summarized above with reference to FIG. 2B. In some embodiments, the key generation method can comprise a hashing method, such as a secure hashing algorithm (e.g., SHA), and the cryptographic key can comprise a hash generated using the untokenized data as an input to the secure hashing algorithm. In other embodiments, the computer system can generate a key seed using the hashing method and the untokenized data. The key seed can comprise a hash generated using the untokenized data as an input to the hashing method. The computer system can generate the cryptographic key by using the key seed as an input to a key generation method, e.g., an Advanced Encryption Standard (AES) key generator used to generate AES cryptographic keys.

At step 314, the computer system can generate a format-preserving token by encrypting the dummy data using the cryptographic key and a format-preserving encryption method, thereby generating a format-preserving token corresponding to the untokenized data. In some embodiments, this format-preserving token may not contain the non-tokenizing data elements and may be referred to as an "initial format-preserving token". Such an initial format-preserving token can comprise an "initial format-preserving token sequence", e.g., a sequence of tokenized data elements. An initial format-preserving token 416 comprising the numeric data elements "062557" is depicted at step 432 of FIG. 4B. Later, e.g., at step 316, the computer system can insert the non-tokenizing characters into this initial format-preserving token to produce a "complete" format-preserving token.

In some embodiments, the format-preserving encryption method can comprise a Feistel-based format-preserving encryption method, such as FF1 or FF3, defined in NIST Standard SP 800-38G. The computer system can additionally encrypt the dummy data using a tweak value and data element set(s) or character set(s), e.g., as depicted in FIG. 2B. Such data element set(s) could be determined by the computer system at step 304 of FIG. 3. The computer system may retrieve the tweak value and the data element set(s) if necessary, e.g., from a database or memory element. As described above, tweak values can define encryption mappings between plaintext and ciphertext and can enable encryption mappings to be changed without requiring a change to the cryptographic key.

Referring back to FIG. 3, at step 316, the computer system can generate an updated format-preserving token sequence by inserting the one or more non-tokenizing data elements into an initial format-preserving token sequence (e.g., generated via format-preserving encryption, as described above) based on one or more non-tokenizing data element locations (e.g., determined at step 306 as described above). A format-preserving token may comprise this updated format-preserving token sequence. In some embodiments, this format-preserving token sequence may be referred to as a "format-preserving token string" comprising a plurality of format-preserving token characters. Step 316 of FIG. 3 is depicted at step 434 of FIG. 4B. In FIG. 4B, non-tokenizing data elements comprising dashes "-" are inserted into the initial format preserving token 416 (comprising the sequence of tokenized data elements "062557") based on non-tokenizing data element locations 410, thereby producing format-preserving token 418 "06-25-57". While this format-preserving token is different from the original identification number, it can reasonably be interpreted as an identification number. Alternatively, in some embodiments, the computer system can insert the one or more non-tokenizing data elements into the sequence of dummy data elements prior to encrypting the sequence of dummy data elements, e.g., if the format-preserving encryption method can accept and ignore non-tokenizing or non-encrypting characters during encryption.

At step 318, the computer system can perform additional processing using the format-preserving token if necessary. For example, the computer system can execute any number of applicable "non-tokenizing data applications", e.g., as described above with reference to FIG. 1. There are a wide variety of "additional processing operations" that can be performed, and a few non-limiting examples are provided below.

As one example, additional processing can comprise storing the format-preserving token in a token vault. Such a token vault can be used to recover the untokenized data from the format-preserving token, if necessary, in a process referred to as "detokenization." For a token vault comprising a database, the computer system can store the format-preserving token along with the untokenized data in the token vault as a key-value pair. Alternatively, the computer system can first encrypt the untokenized data before storing it in the token vault as an extra layer of security. In such cases, the computer system can encrypt the untokenized data using a second cryptographic key (which may be different from the cryptographic key generated at step 314, which may comprise a "first cryptographic key") thereby generating encrypted untokenized data. The computer system can then store the format-preserving token in a token vault in association with the encrypted untokenized data.

As another example, the computer system can perform additional processing using the format-preserving token by transmitting the format-preserving token to a client computer or another external entity, e.g., as depicted in FIG. 1, along with any other relevant data. Such a client computer could use this data for their own analytics purposes. Providing the format-preserving token to the client computer in place of the untokenized data used to generate the format-preserving token, may preserve the privacy of the untokenized data. As another alternative, the client computer could comprise a computer system associated with an external cloud storage server. Storing the format-preserving token on the external cloud storage server (rather than the untokenized data) may protect the privacy of the untokenized data.

As another example, the additional processing could involve the computer system performing private data analysis. The computer system could, e.g., retrieve a dataset associated with the format-preserving token along with one or more other format-preserving tokens and one or more other datasets associated with the one or more other format-preserving tokens. The computer system could then perform a private data analysis on the dataset, the one or more other datasets, the format-preserving token, and the one or more other format-preserving tokens, thereby producing a data analysis result. As an example, for a streaming service, there may be a variety of analytics applications that can be performed on tokenized data rather than untokenized data. It may be possible, for example, to generally determine the popularity of certain shows or movies on the streaming service by performing private data analysis on tokenized user name information along with viewership datasets (which may not comprise private information and may not be tokenized), e.g., datasets indicating which shows are viewed by users corresponding to username tokens. Such a data analysis result could comprise, e.g., the top 10 most popular shows on the streaming service.

As described above, embodiments of the present disclosure are directed to methods for performing format-preserving tokenization as well as performing format-preserving encryption. An exemplary method of performing format-preserving encryption is described below with reference to FIGS. 5, 6A, and 6B.

Figure 5:
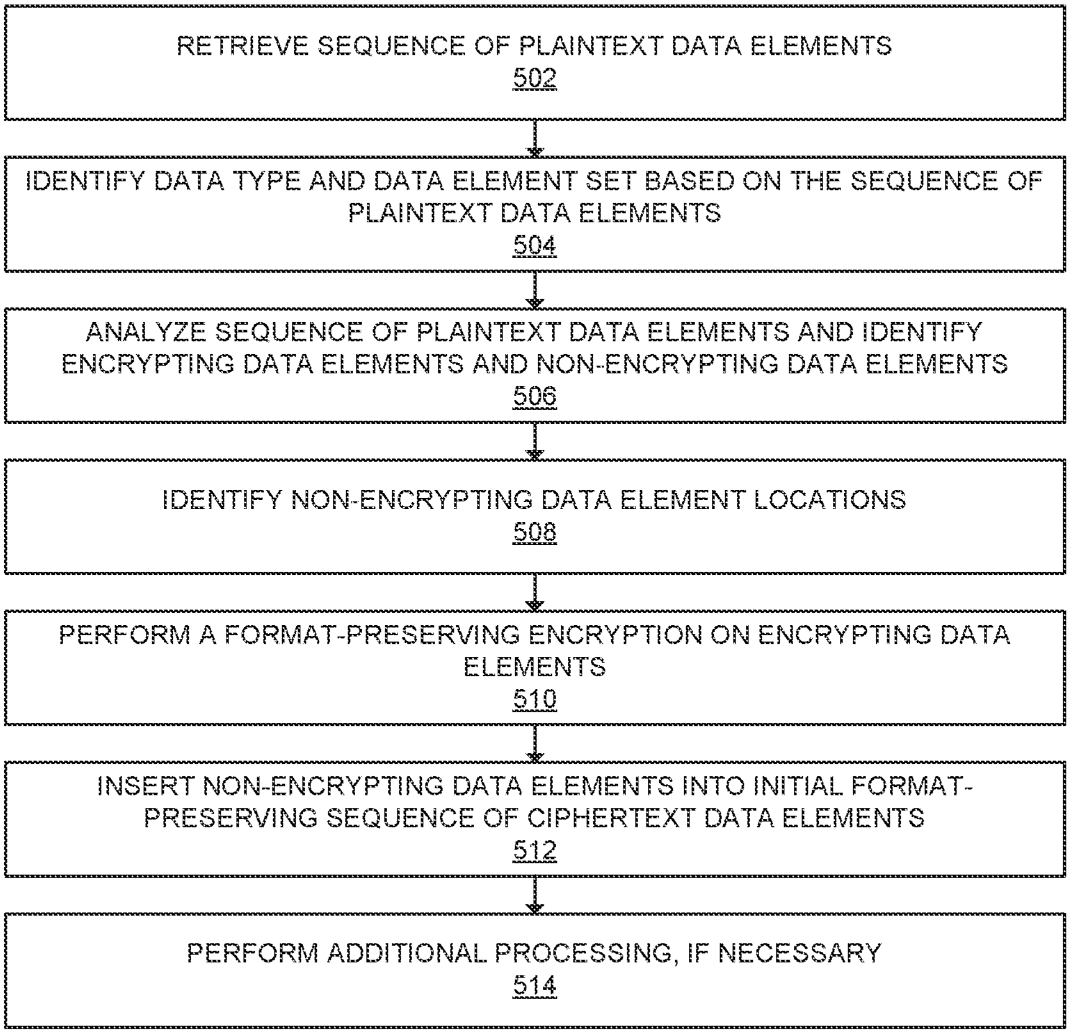
FIG. 5 shows a flowchart of an exemplary method for performing format-preserving encryption according to some embodiments.
Figure 6A:
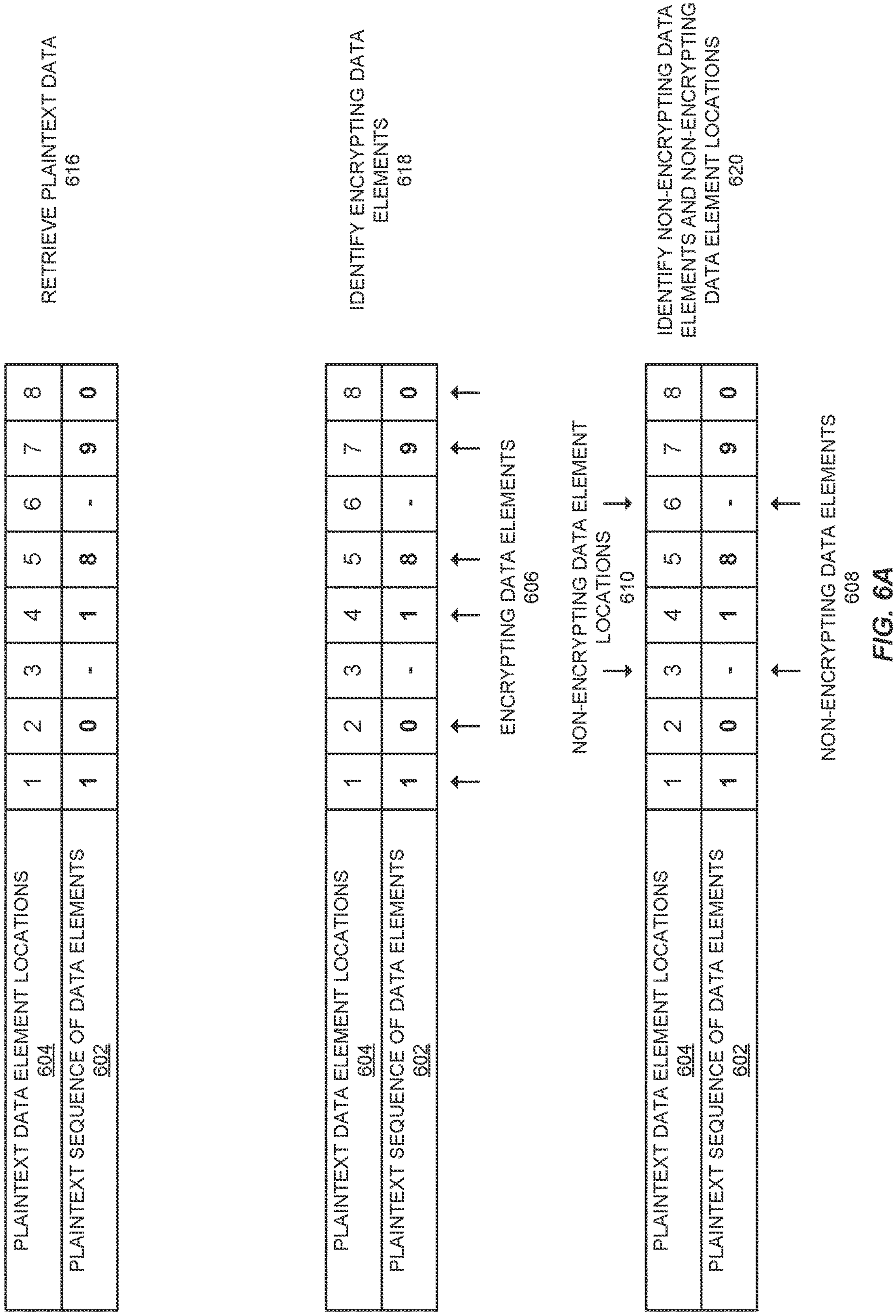
FIGS. 6A-6B illustrate a format-preserving encryption method performed on an exemplary sequence of plaintext data elements.

FIG. 5 depicts a flowchart of an exemplary format-preserving encryption method according to some embodiments. At step 502 a computer system can retrieve a sequence of plaintext data elements. The sequence of plaintext data elements can comprise a plurality of plaintext data elements. FIG. 6A depicts the retrieval of plaintext data elements (step 616 in FIG. 6A) comprising an exemplary plaintext sequence of data elements 602, itself comprising a numerical representation of an identification number "10-18-90". Plaintext data element locations 604 can indicate the location of each plaintext data element in the plaintext sequence of data elements 602, e.g., the plaintext data element "8" is located at the $5^{th}$ location in the plaintext sequence of data elements 602.

Referring to FIG. 5, at step 504, the computer system can identify a data type based on the sequence of plaintext data elements. The computer system can use any appropriate method to identify a relevant data type. For example, the computer system can iterate through the sequence of plaintext data elements and attempt to identify a data type based on this iteration. The computer system can use any number and variety of regular expressions (or other appropriate match patterns) in order to identify a data type. As another example, in some cases the data type may be communicated to the computer system when the computer system retrieves the sequence of plaintext data elements (e.g., the sequence of plaintext data elements may be labeled).

Additionally at step 504, the computer system can identify a data element set based on the data type. In some embodiments, the data element set can comprise a combination of multiple data element subsets, e.g., for an English-language name, a data element can comprise a set corresponding to uppercase English letters (one subset) and lowercase English letters (a second subset). The computer system can use any appropriate method to identify the data element set based on the data type. As one non-limiting example, the computer system may maintain a lookup table relating data element sets to data types and may use such a lookup table to determine a data element set based on a data type.

At step 506, the computer system can analyze the sequence of plaintext data elements and identify one or more encrypting data elements and one or more non-encrypting data elements. Step 506 of FIG. 5 is generally depicted in steps 618 and 620 in FIG. 6A. At step 618 of FIG. 6A, for the plaintext sequence of data elements 602 comprising the identification number "10-18-90", the computer system can identify encrypting data elements 606 comprising the numerical digits of the plaintext sequence of data elements 602. Likewise, at step 620 of FIG. 6A, the computer system identifies the non-encrypting data elements 608 comprising the dashes "-" in the plaintext sequence of data elements 602.

Referring to FIG. 5, at step 508 the computer system can identify one or more non-encrypting data element locations. These non-encrypting data element locations can indicate one or more positions of the one or more non-encrypting data elements in the sequence of plaintext data elements. In FIG. 6A, the computer system identifies non encrypting data element locations 610 at step 620, i.e., locations 3 and 6, indicating that the dashes are located at the $3^{rd}$ and $6^{th}$ position in the plaintext sequence of data elements 602.

Referring to FIG. 5, at step 510 the computer system can perform a format-preserving encryption on the one or more encrypting data elements, thereby producing an initial format-preserving sequence of ciphertext data elements. The initial format-preserving sequence of ciphertext data elements can comprise one or more ciphertext data elements, which may match the data element set(s) determined at step 504. For example, if the sequence of plaintext comprises an identification number and a corresponding data element set comprises the Arabic numerals, then the initial format-preserving sequence of ciphertext data elements may also comprise Arabic numerals.

Figure 6B:
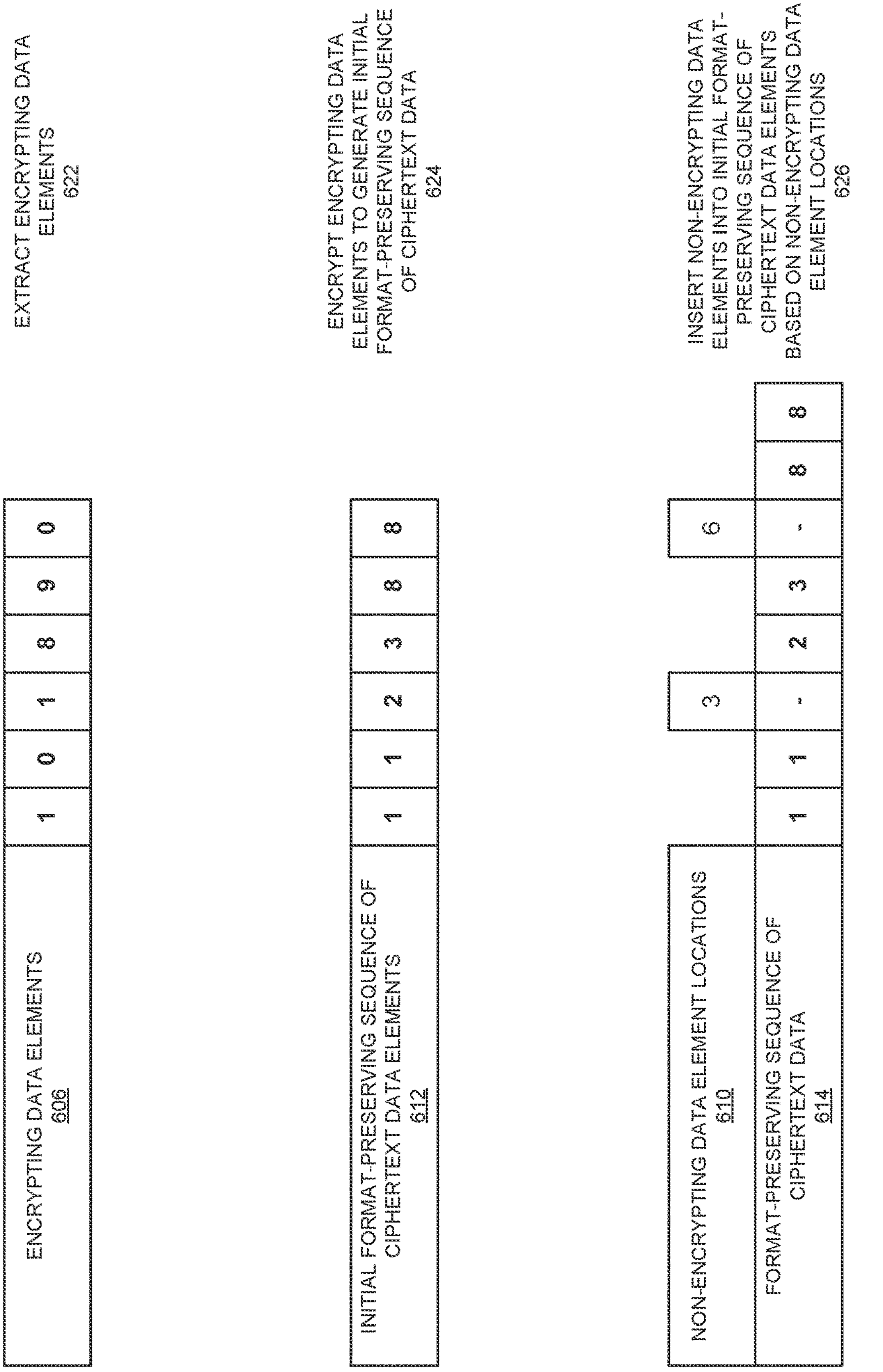

Step 510 of FIG. 5 is generally depicted at steps 622 and 624 of FIG. 6B. At step 622, the computer system can extract the encrypting data elements 606 from the sequence of plaintext data elements. Afterwards, at step 624 the computer system can encrypt the encrypting data elements 606 to produce an initial format-preserving sequence of ciphertext data elements 612.

Referring to FIG. 5, at step 512, the computer system can insert the one or more non-encrypting data elements into the initial format-preserving sequence of ciphertext data elements based on the one or more non-encrypting data element locations, thereby producing a format-preserving sequence of ciphertext data elements. Step 512 of FIG. 5 is depicted at step 626 of FIG. 6B. In FIG. 6B, non-encrypting data elements comprising dashes "-" are inserted into the initial format-preserving sequence of ciphertext data elements 612 (comprising the sequence of ciphertext data elements "112388" based on non-encrypting data element locations 610, thereby producing the format-preserving sequence of ciphertext data 614 "11-23-88". This format-preserving sequence of ciphertext data 614 can reasonably be interpreted as an identification number.

Referring to FIG. 5, at step 514 the computer system can perform additional processing using the format-preserving sequence of ciphertext data, if necessary, including, e.g., storing the format-preserving sequence of ciphertext data in a database, sending the format-preserving sequence of ciphertext data to a client computer, performing private data analysis using the format-preserving sequence of ciphertext data, or any other additional processing operation.

Figure 7:
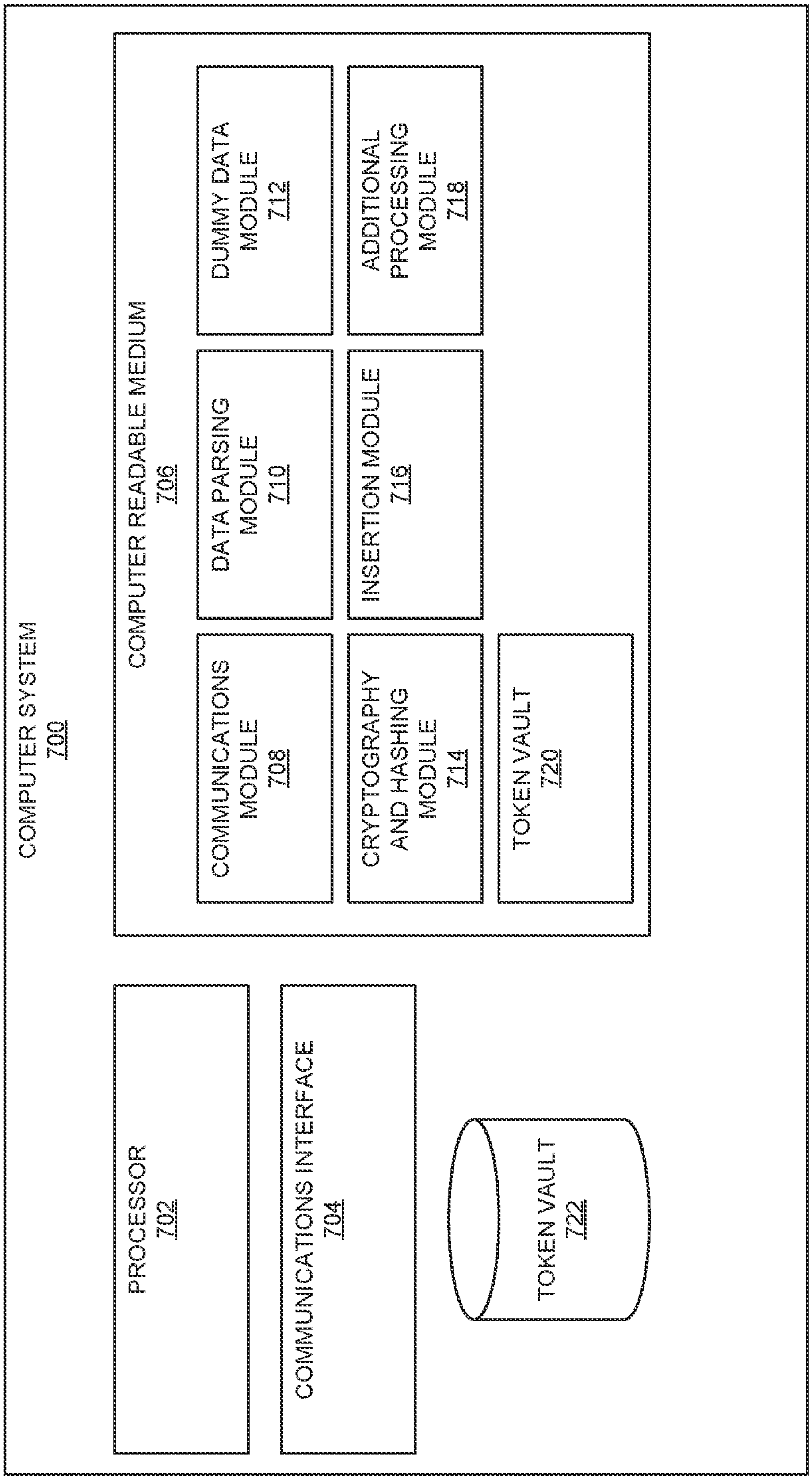
FIG. 7 shows an exemplary computer system according to some embodiments of the present disclosure.

A computer system according to embodiments (e.g., a computer system that performs format-preserving encryption and tokenization operations, as described above) may be better understood with reference to FIG. 7, which shows an exemplary computer system 700 comprising a processor 702, a communications interface 704, and a computer readable medium 706. The computer readable medium 706 may be non-transitory and coupled to the processor 702. The computer readable medium 706 may comprise instructions that, when executed by the one or more processors cause the computer system to perform some methods according to embodiments. The computer readable medium 706 may store or contain data, code, and/or software modules which may be used by computer system 700 to implement these methods. These data, code, and/or software modules may include a communications module 708, a data parsing module 710, a dummy data module 712, a cryptography and hashing module 714, an insertion module 716, an additional processing module 718, and a token vault 720. The computer system may possess a token vault 722 outside of the computer readable medium 706, instead of or in addition to token vault 720. Alternatively, the computer system may communicate with or otherwise access an external token vault (not pictured), via communications interface 704 and communications module 708.

Processor 702 may comprise any suitable data computation device or devices. Processor 702 may be able to interpret code and carry out instructions stored on computer readable medium 706. Processor 702 may comprise a Central Processing Unit (CPU) operating on a reduced instructional set and may comprise a single or multi-core processor. Processor 702 may also include an Arithmetic Logic Unit (ALU) and a cache memory.

Communications interface 704 may comprise any interface by which computer system 700 can communicate with other devices or computers, such as one or more data sources or external entities such as client computers (e.g., as depicted in FIG. 1). Examples of communications interfaces include wired interfaces, such as USB, Ethernet, or FireWire, as well as wireless interfaces such as Bluetooth or Wi-Fi receivers. Computer system 700 may possess multiple communications interfaces 704. As an example, computer system may communicate through an Ethernet interface as well as a USB port.

Communications module 708 may comprise code, software, or instructions that may be interpreted and executed by processor 702. This code or software may be used by the computer system 700 to communicate with other computers, devices, and entities, such as one or more data sources, client computers, etc., as depicted in FIG. 1. Particularly, the computer system 700 can use communications module 708 to retrieve any variety of untokenized data, including sequences of untokenized data elements (or strings of untokenized characters or sequences of plaintext data elements), representative of any variety of data types (e.g., segments of text, names, numbers, dates, etc.) of any variety of data formats and corresponding to any variety of character sets or data element sets (e.g., numeric digits, alphabets, sets of logograms, symbols associated with syllabaries, typographical symbols, etc.), as described above. Additionally, the computer system 700 can use communications module 708 as part of an additional processing operation using the format-preserving token (e.g., as described above with reference to step 320 of FIG. 3). For example, the computer system 700 can use communications module 708 to transmit a format-preserving token to a client computer.

Data parsing module 710 may comprise code, software, or instructions that may be interpreted and executed by processor 702. This code or software may be used by the computer system 700 to parse untokenized data. As an example, the computer system 700 can use parsing module to determine a length of a sequence of untokenized data elements (sometimes referred to as a "first sequence of data elements") which may later be used to generate dummy data as described above. As another example, the computer system 700 can use data parsing module 710 to identify one or more tokenizing data elements, one or more non-tokenizing data elements, and one or more non-tokenizing data element locations in the untokenized data. As yet another example, the computer system can use data parsing module to identify a data type, a data format, and a data element set based on the data type. Further, the computer system 700 can use data parsing module to analyze a sequence of plaintext data element (e.g., when encrypting rather than tokenizing) and identify one or more encrypting data elements, one or more non-encrypting data elements, and one or more non-encrypting data element locations.

Dummy data module 712 may comprise code, software, or instructions that may be interpreted and executed by processor 702. This software or code may be used by the computer system 700 to perform operations associated with generating dummy data corresponding to untokenized data. The computer system 700 can use dummy data module 712 to determine a dummy data element and generate a sequence of dummy data elements comprising a number of repeating instances of the dummy data element equal to a number of tokenizing data elements in the one or more tokenizing data elements (determined, e.g., using data parsing module 710), or alternatively to a length determined using data parsing module 710.

Cryptography and hashing module 714 may comprise code, software, or instructions that may be interpreted and executed by processor 702. This software or code may be used by computer system 700 to perform operations associated with performing cryptographic operations and generating hashes. For example, computer system 700 can use cryptography and hashing module to generate a cryptographic key using untokenized data and a key generation method. Such a key generation method could comprise a secure hashing algorithm (SHA), and computer system 700 can cryptography and hashing module 714 to generate a hash using the untokenized data as an input to the secure hashing algorithm. Such a hash could be used as the cryptographic key. As another alternative, the computer system 700 can use the hash as a key seed input to a key generation method (e.g., to an AES key generation method used to generate an AES key).

Further, the computer system 700 can use cryptography and hashing module 714 to perform format-preserving encryption on either dummy data or encrypting data elements associated with plaintext data. In more detail, the computer system 700 can use cryptography and hashing module 714 to encrypt dummy data using a cryptographic key and a format-preserving encryption method (e.g., a Feistel-based format-preserving encryption method) and optionally a tweak value, thereby generating a format-preserving token (or an "initial format-preserving token") corresponding to the untokenized data. Likewise, the computer system 700 can use cryptography and hashing module 714 to perform a format-preserving encryption on one or more encrypting data elements (extracted, e.g., from a sequence of plaintext data), thereby generating an initial format-preserving sequence of ciphertext data elements.

Insertion module 716 may comprise code, software or instructions that may be interpreted and executed by processor 702. This software may be used by the computer system 700 to insert non-tokenizing and non-encrypting data elements into sequences of dummy data elements, initial format-preserving tokens and initial format-preserving ciphertexts, as described above. More specifically, the computer system 700 can use insertion module 716 to insert one or more non-tokenizing data elements into a sequence of dummy data elements based on one or more non-tokenizing data element locations. Alternatively, the computer system 700 can use insertion module 716 to insert the one or more non-tokenizing data elements into an initial format-preserving token sequence based on the one or more non-tokenizing data element locations, thereby producing an updated format-preserving token. Further, the computer system 700 can use insertion module 716 to insert one or more non-encrypting data elements into an initial format-preserving sequence of ciphertext data elements based on one or more non-encrypting data element locations, thereby producing a format-preserving sequence of ciphertext data elements.

Additional processing module 718 can comprise code, software, or instructions that may be interpreted and executed by processor 702. This code or software may be used by the computer system 700 to perform various additional processing operations using format-preserving tokens. As non-limiting examples, the computer system 700 can use additional processing module 718 to store format-preserving tokens in a token vault (e.g., token vault 720 or token vault 722), transmit format-preserving tokens to client computers, or perform private data analysis using format-preserving tokens, e.g., by retrieving a dataset associated with a format-preserving token, retrieving one or more other data sets associated with one or more other format-preserving tokens, and performing a private data analysis on the dataset, the one or more other data sets, the format-preserving token, and the one or more other format-preserving tokens, thereby producing a data analysis result.

In some embodiments, the computer readable medium 706 may store or otherwise implement a token vault 720, e.g., a dedicated region of memory on computer readable medium 706 used to store tokens. Such memory may be secure memory or otherwise access controlled memory. Alternatively, the computer system 700 may implement a token vault 722 "outside" of computer readable medium 706, e.g., on a separate memory element. As yet another alternative, the computer system 700 may communicate with an external token vault, e.g., as part of a larger data management system, such as the exemplary data management system 106 in FIG. 1.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can involve computer systems configured to perform the steps of any of the methods described herein, potentially with different components performing respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising:

retrieving, by a computer system, untokenized data;

generating, by the computer system, dummy data corresponding to the untokenized data;

generating, by the computer system, a cryptographic key using the untokenized data and a key generation method;

encrypting, by the computer system, the dummy data using the cryptographic key and a format-preserving encryption method, thereby generating a format-preserving token corresponding to the untokenized data; and performing additional processing using the format-preserving token, the additional processing comprising one or more of (a) storing the format-preserving token in a token vault, (b) transmitting the format-preserving token to a client computer or another external entity, or (c) performing a private data analysis using the format-preserving token.

2. The method of claim 1, wherein the format-preserving encryption method comprises a Feistel-based format-preserving encryption method.

3. The method of claim 1, wherein the computer system encrypts the dummy data using a tweak value in addition to the cryptographic key, and wherein the method further comprises: retrieving, by the computer system, the tweak value.

4. The method of claim 1, wherein the untokenized data comprises a first sequence of data elements, wherein generating the dummy data corresponding to the untokenized data comprises:

determining, by the computer system, a length of the first sequence of data elements, wherein the length of the first sequence of data elements is equal to a number of data elements in the first sequence of data elements;

determining, by the computer system, a dummy data element; and generating, by the computer system, the dummy data based on the length of the first sequence of data elements and the dummy data element by generating a second sequence of data elements comprising a plurality of repeating instances of the dummy data element, wherein a length of the second sequence of data elements is equal to the length of the first sequence of data elements, wherein the dummy data comprises the second sequence of data elements.

5. The method of claim 1, wherein the key generation method includes a hashing method.

6. The method of claim 1, wherein the key generation method comprises a secure hashing algorithm (SHA), and wherein the cryptographic key comprises a hash generated using the untokenized data as an input to the secure hashing algorithm.

7. The method of claim 1, wherein:

the untokenized data comprises an untokenized string comprising a plurality of untokenized characters;

the plurality of untokenized characters correspond to one or more character sets;

the format-preserving token comprises a format-preserving token string comprising a plurality of tokenized characters; and the plurality of tokenized characters correspond to the one or more character sets.

8. The method of claim 7, wherein the one or more character sets comprise one or more of the following:

one or more sets of numeric digits;

one or more alphabets;

one or more sets of logograms;

one or more sets of symbols associated with one or more syllabaries;

one or more sets of typographical symbols; and one or more other symbols.

9. The method of claim 1, wherein:

the untokenized data is associated with one or more data types;

the one or more data types are associated with one or more respective data formats; and the format-preserving token is formatted in accordance with the one or more respective data formats.

10. The method of claim 9, wherein the one or more data types include one or more of the following:

one or more segments of text;

one or more names;

one or more numbers; and one or more dates.

11. The method of claim 1, wherein the cryptographic key comprises a first cryptographic key, and wherein performing the additional processing using the format-preserving token comprises:

encrypting, by the computer system, the untokenized data using a second cryptographic key, thereby generating encrypted untokenized data; and storing, by the computer system, the format-preserving token in the token vault in association with the encrypted untokenized data.

12. The method of claim 1, wherein performing the additional processing using the format-preserving token comprises transmitting the format-preserving token to the client computer.

13. The method of claim 1, wherein performing the additional processing using the format-preserving token comprises:

retrieving, by the computer system, a dataset associated with the format-preserving token;

retrieving, by the computer system, one or more other format-preserving tokens;

retrieving, by the computer system, one or more other datasets associated with the one or more other format-preserving tokens; and performing, by the computer system, the private data analysis on the dataset, the one or more other datasets, the format-preserving token, and the one or more other format-preserving tokens, thereby producing a data analysis result.

14. The method of claim 1, wherein the untokenized data comprises a sequence of untokenized data elements comprising a plurality of untokenized data elements, wherein the plurality of untokenized data elements includes one or more tokenizing data elements and one or more non-tokenizing data elements, and wherein generating the dummy data corresponding to the untokenized data comprises:

identifying, by the computer system, the one or more tokenizing data elements;

determining, by the computer system, a dummy data element; and generating, by the computer system, a sequence of dummy data elements comprising a number of repeating instances of the dummy data elements equal to a number of tokenizing data elements in the one or more tokenizing data elements, wherein the dummy data comprises the sequence of dummy data elements.

15. The method of claim 14, wherein the untokenized data comprises an account number.

16. The method of claim 14, wherein encrypting the dummy data using the cryptographic key and the format-preserving encryption method, thereby generating the format-preserving token corresponding to the untokenized data comprises:

encrypting, by the computer system, the dummy data using the cryptographic key, thereby generating an initial format-preserving token, wherein the initial format-preserving token comprises an initial format-preserving token sequence;

identifying, by the computer system, the one or more non-tokenizing data elements and one or more non-tokenizing data element locations; and inserting, by the computer system, the one or more non-tokenizing data elements into the initial format-preserving token sequence based on the one or more non-tokenizing data element locations, thereby producing an updated format-preserving token sequence, wherein the format-preserving token comprises the updated format-preserving token sequence.

17. The method of claim 14, wherein the one or more non-tokenizing data elements comprise one or more delimiters associated with one or more data types of the untokenized data.

18. The method of claim 14, wherein:

the untokenized data comprises an identification number.

19. A computer system comprising:

one or more processors; and a non-transitory computer readable medium coupled to the one or more processors, the non-transitory computer readable medium comprising instructions that, when executed by the one or more processors, cause the computer system to perform a method comprising:

retrieving untokenized data;

generating dummy data corresponding to the untokenized data;

generating a cryptographic key using the untokenized data and a key generation method;

encrypting the dummy data using the cryptographic key and a format-preserving encryption method, thereby generating a format-preserving token corresponding to the untokenized data; and performing additional processing using the format-preserving token, the additional processing comprising one or more of (a) storing the format-preserving token in a token vault. (b) transmitting the format-preserving token to a client computer or another external entity, or (c) performing a private data analysis using the format-preserving token.

20. The computer system of claim 19, wherein the format-preserving token is a format-preserving payment token.

* * * * *